US006999879B2

(12) United States Patent
Houck

(10) Patent No.: US 6,999,879 B2
(45) Date of Patent: Feb. 14, 2006

(54) METHOD FOR CONTROLLING SEISMIC COVERAGE USING DECISION THEORY

(75) Inventor: Richard T. Houck, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 111 days.

(21) Appl. No.: 10/778,864

(22) Filed: Feb. 13, 2004

(65) Prior Publication Data

US 2004/0230379 A1 Nov. 18, 2004

Related U.S. Application Data

(60) Provisional application No. 60/470,304, filed on May 14, 2003.

(51) Int. Cl.
*G06F 19/00* (2006.01)

(52) U.S. Cl. ............................................. 702/14; 703/5

(58) Field of Classification Search .................. 702/14, 702/13, 12; 703/5, 10; 166/250.15; 367/73
See application file for complete search history.

(56) References Cited

U.S. PATENT DOCUMENTS

| | | | | |
|---|---|---|---|---|
| 5,638,269 | A | * | 6/1997 | Fournier et al. ............... 702/14 |
| 5,838,634 | A | * | 11/1998 | Jones et al. .................... 367/73 |
| 5,992,519 | A | * | 11/1999 | Ramakrishnan et al. ....................... 166/250.15 |
| 6,131,070 | A | | 10/2000 | Ferber .......................... 702/14 |
| 6,266,619 | B1 | * | 7/2001 | Thomas et al. ............... 702/13 |
| 6,343,256 | B1 | | 1/2002 | Winbow et al. .............. 702/18 |
| 6,356,844 | B1 | * | 3/2002 | Thomas et al. ............... 702/12 |

OTHER PUBLICATIONS

Calderon et al., (1999) *"Efficient Computation of 3D Acquisition Footprint Ananlysis"*, 69th Ann. Internat. Mtg., Soc. Expl. Geophys., pp. 1489-1492.

Schneider and Winbow, (1999) *"Efficient and Accurate Modeling of 3-D Seismic Illumination"*, Expanded Abstracts, 69th Ann. International Mtg., Soc. Of Expl. Geophys., pp. 633-636.

Laurain et al., (2002) *"Towards Better Amplitude Maps by Simulator Migration,"* Expanded Abstracts, 72nd Ann. Internat. Mtg., Soc. Expl. Geophys.

Wloszczowski, D. et al. (1998) "3D Acquisition Parameters: A Cost-Saving Study", *SEG Expanded Extracts XP-002268570*.

* cited by examiner

*Primary Examiner*—John Barlow
*Assistant Examiner*—Victor J. Taylor

(57) ABSTRACT

A method of devising infill strategy in planning a seismic survey, using Monte Carlo methods and value-of-information theory to assess the probable value in well pay-out of a given increase in survey costs to reduce artifact degradation of the quality of the seismic data, where the seismic data will be used to make well-drilling decisions.

6 Claims, 4 Drawing Sheets

METHOD FOR CONTROLLING SEISMIC COVERAGE USING DECISION THEORY

This application claims the benefit of U.S. Provisional Patent Application No. 60/470,304 filed May 14, 2003.

FIELD OF THE INVENTION

This invention relates generally to the field of geophysical prospecting and, more particularly, to designing and executing three-dimensional (3D) seismic surveys. Specifically, the invention is a method for assessing the economic incentive to acquire seismic infill, given a specific irregular arrangement of sources and receivers.

BACKGROUND OF THE INVENTION

Three-dimensional seismic surveys are typically designed to have an approximately uniform spatial distribution of sources and receivers over the survey area. Because conditions in the field are less than ideal, the design geometry cannot be perfectly implemented and the actual distribution of sources and receivers is more irregular than desired. Irregular geometry (too many sources and receivers in some locations and too few in others) violates the assumptions made by commonly used imaging algorithms, resulting in a distorted image of the subsurface. The most commonly recognized type of distortion is the "acquisition footprint"—spurious amplitude variations that are associated with the interaction between acquisition geometry and the imaging algorithm. These amplitude artifacts may interfere with interpretation of truly geologic variations in the amplitude of the reflector.

Because amplitude artifacts associated with irregular geometry may negatively impact an interpretation, it is common practice to acquire additional seismic data to fill in areas of reduced coverage. For a typical marine streamer survey, infill acquisition increases the amount of data by about 20%, with an accompanying increase in cost. The increase can be significantly larger for surveys that encounter operational problems.

Decisions about acquiring infill are currently made qualitatively, based on visual inspection of a coverage map. Coverage maps are produced by a commercially available binning system on the seismic vessel, such as the REFLEX binning system produced by Concept Systems Ltd. Coverage maps account only for the surface positions of the source-receiver pairs recorded in the survey; they do not account for the effect of imaging. From the coverage map, quality control personnel make a qualitative judgement about the potential effects of irregular coverage on an interpretation and about the economic tradeoff between increased acquisition cost and possible impact on future drilling results. Because infill decisions are almost purely qualitative, it is difficult to insure that the optimum amount of infill has been acquired.

Methods that account for the effect of imaging have been described in the literature by Calderon et al., "Efficient computation of 3D acquisition footprint analysis, 69th Ann. Internat. Mtg., Soc. Expl. Geophys., 1489–1492 (1999); Schneider and Winbow, "Efficient and Accurate Modeling of 3-D Seismic Illumination," Expanded Abstracts, 69th Ann. International Mtg., Soc. Of Expl. Geophys., pp. 633–636 (1999); Laurain et al., "Towards better amplitude maps by simulator migration," Expanded Abstracts, 72nd Ann. Internat. Mtg., Soc. Expl. Geophys. (2002); U.S. Pat. No. 6,131,070 to Ferber (2000); and U.S. Pat. No. 6,343,256 to Winbow et al. (2002). Compared to coverage maps, these methods provide more realistic estimates of the level of amplitude artifacts that will result from any specific irregular arrangement of sources and receivers. However, no existing approach attempts to quantify the effect that the artifacts will have on an interpretation of the seismic data, and no existing approach quantifies the loss in economic value that is caused by the artifacts. The present invention satisfies these needs.

SUMMARY OF THE INVENTION

In one embodiment, the present invention is a method for predicting whether increased coverage in a seismic survey of a petroleum reservoir is economically justified, where ranges of reservoir properties are known and dependency of reservoir economics on reservoir properties are also known. The steps in this embodiment comprise (a) selecting two different survey strategies which the user of the invention wishes to compare (one strategy having more thorough coverage of the target area than the other, and hence costing more); (b) selecting one or more reservoir properties (e.g., porosity) that affect the economics of the particular reservoir in a known way, and selecting a seismic attribute that is known to be a predictor of the selected reservoir property or properties; (c) generating a (theoretical) reservoir model for the particular reservoir, selecting a specific value of each reservoir property from within the known range for that property; (d) using the reservoir model to generate a (synthetic) seismic trace; (e) computing the selected seismic attribute from the seismic trace; (f) distorting the computed attribute value with artifact information based on one of the survey strategies; (g) using the distorted attribute value to predict the selected reservoir property or properties; (h) using the predicted value(s) from the preceding step and the known relationship between the selected reservoir property or properties and the reservoir economics to predict the net economic value of petroleum that a well would produce under the specific reservoir model conditions; (i) repeating steps (f)–(h) for the other survey strategy; and (j) finding the difference between the well values for the two survey strategies and comparing that difference to the survey cost difference.

In some embodiments of the present invention, the step of generating a reservoir model includes random sampling of known probability distributions for those reservoir properties represented by a range of values, or at least for those properties selected in step (b) above. Further, the artifact information for step (f) above is a fold value obtained by random sampling of a map of the survey strategy. In preferred embodiments, the steps (c) through (j) above are repeated until the results satisfy a user-determined statistics criterion. In other embodiments, the attribute value is adjusted not only for artifact impact, but also for noise. In yet other embodiments, the simulation cycle of the present inventive method may be used to generate calibration data (attribute value vs. reservoir properties) that can then be used in step (g) above to make the reservoir property predictions.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which are included within the spirit and scope of the invention, as defined by the appended claims.

DETAILED DESCRIPTION OF THE PREFERRED EMBODIMENTS

The present invention uses "value of information" concepts from decision theory to provide an objective, quantitative basis for making infill decisions. Value of information analysis is an established topic in decision theory (see, for example, P. D. Newendorp, *Decision Analysis for Petroleum Exploration*, chapter 10, PennWell, 1975), but it has not previously been applied to the execution and processing of seismic surveys. In a preferred embodiment, the present invention uses a Monte Carlo simulation procedure that models, in a simplified way, the acquisition, processing, and interpretation of a seismic survey. The simulation includes the effects of imaging, geologic variability in the target reflector, specific interpretation objectives, and the economic impact on drilling results. Except for the acquisition geometry, all the information needed to run the procedure can be gathered before the survey begins. This enables personnel in the field to make objective, semi-automated infill decisions and eliminates the need for time consuming consultation with a central office.

The premise behind value of information theory is that information, such as the amplitude of a reflector in a seismic data set, has economic value to the extent that it reduces the uncertainty associated with a decision that involves money. Seismic surveys are normally used to make decisions about drilling wells, so the value of a seismic data set is related to the value of the wells that might be drilled based on that data set. Improving the quality of a data set (by acquiring infill or by other enhancements) adds value to the extent that it increases the value of the wells drilled based on the higher quality data. Estimating the economic value of an improvement in data quality requires two estimates of the value of the same drilling program—one based on the original data and the other based on the improved data. The difference in value is the value of the increase in data quality.

Figure 1:
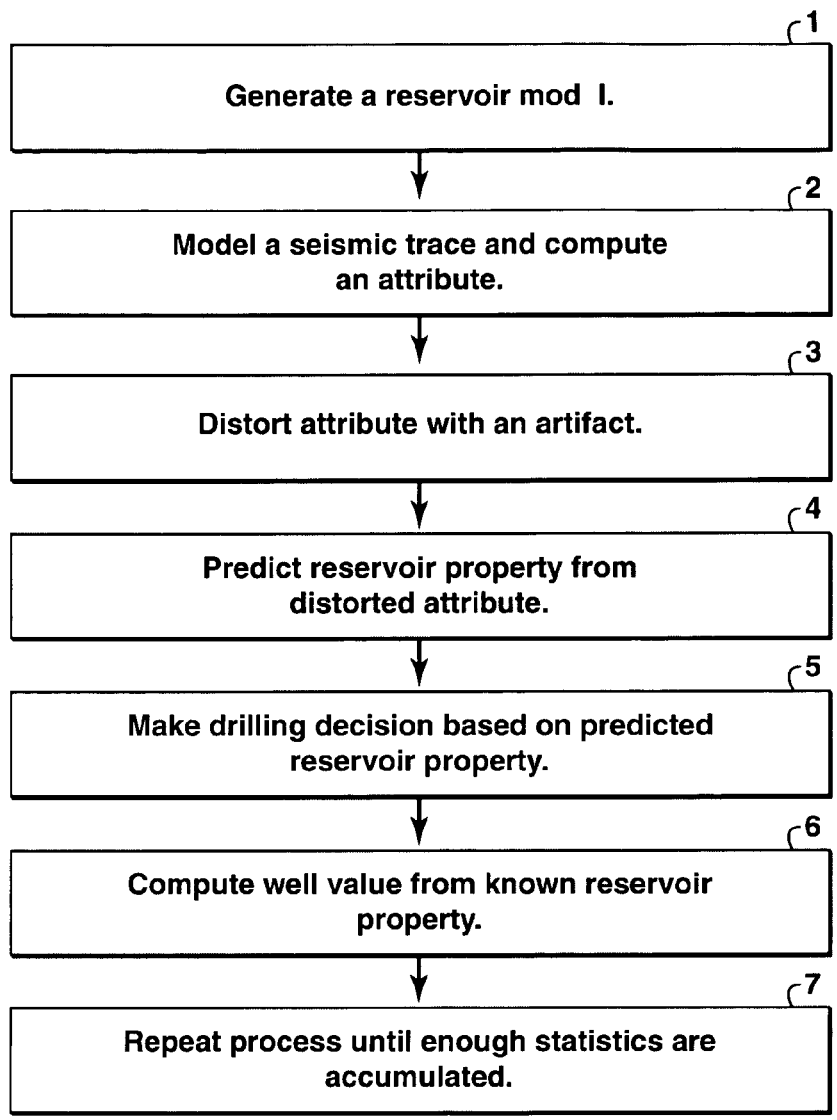
FIG. 1 is a flowchart illustrating the basic steps of the present inventive method.

FIG. 1 is a flow chart showing the main steps of the present invention. In step 1, a model of the reservoir is obtained or developed. The model may be as simple as a sand layer (the reservoir) sandwiched between two shale layers, but more complex models may also be used. Some model parameters, i.e., reservoir properties, may be considered fixed, while others must be represented by a range of values. Some of the model parameters will affect well economics, and at least some of these will need to be represented by a range of values. For each such parameter, a probability distribution must be estimated, quantifying the probability of each value within the range based on the variability in rock properties expected for the target reservoir. Such reservoir model is then random sampled to complete step 1. Persons familiar with Monte Carlo simulation will know that although the sampling is random, the probability of getting any particular result is not a constant, but instead is that probability given by the estimated probability distribution being used. The result of step 1 therefore is one possible (probabilistic) realization of the more general reservoir model, i.e., a reservoir model with every parameter uniquely specified. These will be the "known" values of the reservoir properties to be used later in step 6. Three of the reservoir layer properties affect the economic value of the reservoir model: porosity, thickness, and fluid type. Other properties, such as shale elastic properties and sand matrix properties, are irrelevant to the value of the reservoir but affect the seismic response. These act as "geologic noise" sources that increase the uncertainty in economically important reservoir properties predicted from seismic data.

In step 2, the layered reservoir model from step 1 is used along with a user-supplied wavelet to generate seismic traces at one or more offsets (source-receiver distance). The wavelet is selected to match the frequency range expected in the real seismic data at the target reflector. A person skilled in the art will readily understand how to do this. For example, the traces may be generated by ray tracing through the model, computing Zoeppritz reflection coefficients for the top and bottom of the reservoir, and attaching the wavelet to each reflection. Simmons and Backus compare several alternative approaches to this type of modeling in "AVO modeling and the locally converted shear wave," *Geophysics* 59, No. 9, 1237–1248. Depending on the type of analysis requested, the modeled traces are stacked and the desired poststack or AVO attribute is computed. AVO means amplitude vs. offset, a well-known type of analysis whereby hydrocarbon presence can be predicted from seismic amplitudes at two or more offsets, or quantities derived from them (AVO attributes). This completes step 2.

If an artifact-free case is being simulated (which might be done for comparison purposes), step 3 would be skipped. Otherwise, the attribute value must be modified by the appropriate artifacts. Irregular acquisition geometry produces two types of artifacts: imaging artifacts that multiply the true reflection amplitudes, and additive noise artifacts. The present invention incorporates imaging artifacts by drawing an artifact multiplier from a random location on an externally generated artifact map, then uses the multiplier to distort the attribute value from the modeled trace. This along with the other steps of the present invention are further illustrated in the test example presented below. The artifact map may come from any procedure that models amplitude artifacts for a specific acquisition geometry and target reflector, such as that described by Schneider and Winbow in the reference stated previously. A noise artifact may also be added to the distorted attribute value. In one embodiment of the present invention, incoherent noise is modeled internally, using the imaging artifact values. Coherent noise may be modeled externally by running a noise wavefield through the artifact modeling procedure.

In step 4, a previously generated calibration data set is used to predict the value of a reservoir property from the modeled (distorted) attribute value. The reservoir property selected for this step will be a property that affects reservoir economics, such as fluid type, porosity, porosity-thickness, or hydrocarbon porosity-thickness. It is straightforward to include additional properties. The calibration data set consists of a specified number of random reservoir models generated from the same rock property distributions used to generate the survey data set. Each calibration point pairs a known value of the reservoir property of interest with the corresponding modeled (and possibly artifact-distorted) attribute value. In one embodiment of the invention, a linear least-squares fit is made to the calibration data, and that relationship is used to carry out step 4, i.e., to predict the reservoir property value based on the distorted attribute value from step 3. In another embodiment, a Bayes estimator (also known as a probabilistic neural net) is used to make the prediction.

In step 5, sufficient economic data about the target reservoir must be supplied, as a function of the reservoir property selected in step 4, to predict whether a well should be drilled at the (hypothetical) location where the attribute value was observed. If the economic data is a function of more than one reservoir property, then the calibration data of step 4 may also be a function of each such reservoir property. Alternatively, some economically important reservoir properties may be represented by their expected values instead of being included in the calibration relationship. Included in the economic parameters that are needed in step 5 are the cost of drilling a well, and a function that assigns an economic value to a value of the reservoir property. In most embodiments of the invention, if the dollar value associated with the predicted reservoir property is greater than the drilling cost, the "decision" in step 5 is that the well is considered to be drilled. Otherwise, the decision is not to drill. The economic data used is preferably known information about the reservoir, but may be assumed information in the absence of better data.

In step 6, the "actual" reservoir properties for the present probabilistic realization (the "known" values from step 1) are used to compute the "actual" value of the well. This value could be either positive, if the value of the reservoir really is greater than the drilling cost, or negative, if the value of the reservoir turns out to be less than the drilling cost. If the decision in step 5 was not to drill the well, it is assigned zero value.

In step 7, steps 1–6 are repeated for additional probabilistic realizations. Averaging well values for a large number of random reservoir models produces an estimate of the expected value of a well, where the drilling decision is based on artifact-contaminated seismic data. The cycling might be stopped, for example, when the average well value changes by less than x percent over the last n loops, where x and n are user selected. If more than one well might be drilled based on the seismic data, the present inventive method can be used to compute the expected value of a drilling program with a specified number of potential drilling locations, and with optional lower and upper limits on the number of wells drilled. For example, one might need to use the seismic data to make drilling decisions about twelve prospects identified from a previous survey. It may be that there would be no financial constraints, and all prospects would be drilled for which the new seismic data predicts a positive economic value. On the other hand, the drilling budget might be limited such that only the five best prospects could be drilled, even if more than five were to be predicted to be economic. Alternatively, there might be a drilling commitment that requires at least two wells to be drilled even if fewer than two are predicted to be economic. The present invention can be used to guide decision making in all such scenarios.

Different levels of infill coverage produce different amplitude artifacts, and, consequently, different estimates of drilling program value. Running a simulation for each competing level of coverage, using the artifacts appropriate to that coverage but with all other parameters held constant, yields a value estimate for each level of coverage under identical geologic conditions. A higher level of coverage is economically justified only if any additional cost associated with the additional coverage is less than the increase in drilling program value.

Previously proposed solutions to the problem of making infill decisions have focused either on better characterizing amplitude artifacts (for example, the previously cited Ferber patent), or on displaying properties of the acquisition geometry other than fold (for example, Jones et al., U.S. Patent Publication No. 20020072856, Jun. 13, 2002, and U.S. Pat. No. 6,470,276 to Lansley, et al. (2002)). No other known solution attempts to quantify the effects of artifacts on an interpretation, or uses value of information analysis to attach an economic value to artifact-contaminated data. The present invention is preferably automated through computer software. Commercial software is available for performing Monte Carlo simulation (for example, @RISK from Palisade Corporation), but the required seismic modeling is not included in any commercial Monte Carlo product. Such additional programming is within the capability of a person skilled in the art.

Although the present invention is described herein in terms of its application to the infill problem in marine streamer acquisition, it also has other applications. Irregular geometry also results in artifacts in ocean bottom cable acquisition and in land acquisition, and the present invention can be used to evaluate artifacts for these acquisition types. Furthermore, the invention can be used to evaluate any change in any of the three categories of input information needed in the invention as diagrammed in FIG. 1, namely (a) the rock property distributions needed in step 1 for generating reservoir models; (b) the amplitude artifact model for distorting seismic attributes artifact, and (c) the economic parameters for making drilling decisions and computing well value. For example, reprocessing the seismic data might reduce the amplitude artifacts associated with the data set. The invention could be used to determine if the economic value of the reduced artifacts justified the cost of the reprocessing. In another example of a different application, time lapse seismic can be modeled by substituting several different pore fluids into each random reservoir model. (Time lapse seismic analysis compares two seismic surveys run over the same reservoir at different times to identify changes in pore fluid caused by hydrocarbon production.) Another possible application arises from attaching a value to well information. Collecting well logs as part of a current drilling program might reduce the uncertainty associated with future drilling decisions by narrowing the range of possible reservoir rock properties. The invention could be used to determine whether the cost of collecting well logs was justified by an increase in the value of future wells. Finally, a change in economic parameters will affect the value of any data gathering that might be planned. The present invention could be used to determine if a specific type of data is still justified under new economic conditions.

EXAMPLE

The following example demonstrates how the present invention can be used to make a decision about whether to acquire infill seismic. The objective of the example is to design a seismic survey over a known gas reservoir that has laterally varying porosity and gas saturation. All other reservoir properties are assumed to be constant.

Figure 2:
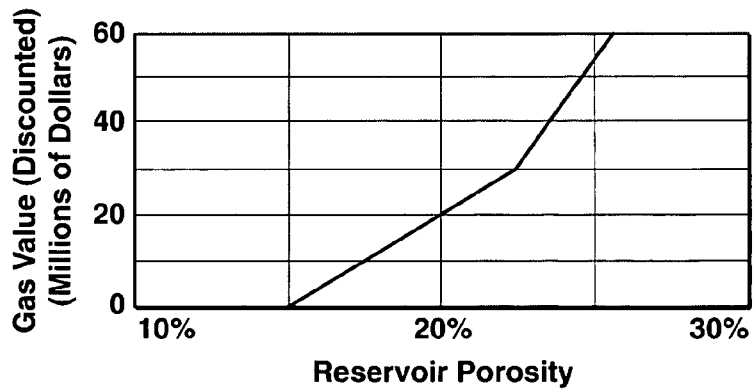
FIG. 2 shows the assumed value of gas in a well as a function of reservoir porosity in an example application of the present invention.

The seismic data will be used to evaluate 10 proposed drilling locations based on predictions of reservoir porosity made from the amplitude of the reflection from the reservoir. It will be assumed that a well costs Ten Million Dollars to drill, and that the present value of the gas in a well increases with the porosity the well encounters as shown in FIG. 2. The values in FIG. 2 do not include drilling costs, so a well is not economic unless the gas value is greater than $10,000,000. At each proposed drilling location, the seismic amplitude observed at the reservoir will be used to predict the reservoir porosity and, using FIG. 2, the economic outcome of a well drilled at that location.

In this example, seismic amplitude will be an imperfect predictor of porosity because of noise in the seismic data, uncontrolled variation in gas saturation, and artifacts associated with irregular acquisition geometry. These imperfect predictions of porosity mean that predictions of the economic outcome of a well will be uncertain. Some non-economic drilling locations will be predicted to be economic, and some economically viable locations will be predicted to be non-economic. Both types of incorrect predictions will reduce the value of the 10-well drilling program.

Noise in the seismic data and variations in gas saturation will be assumed to be uncontrollable factors that impose a base, irreducible level of uncertainty on porosity predictions. However, uncertainty caused by amplitude artifacts can be reduced (at a price) by acquiring infill data.

For the example, it will be further assumed that irregular acquisition geometry is expected because of variable cross-currents in the survey area. Currents cause the streamers to be displaced from the sail direction, producing a phenomenon called "feathering". If currents vary with time, adjacent sail lines will experience different amounts of feather. Although the details of the feather variations cannot be predicted in advance, historical information about current variability is commonly available and can be used in designing the survey.

Figures 3A, 3B:
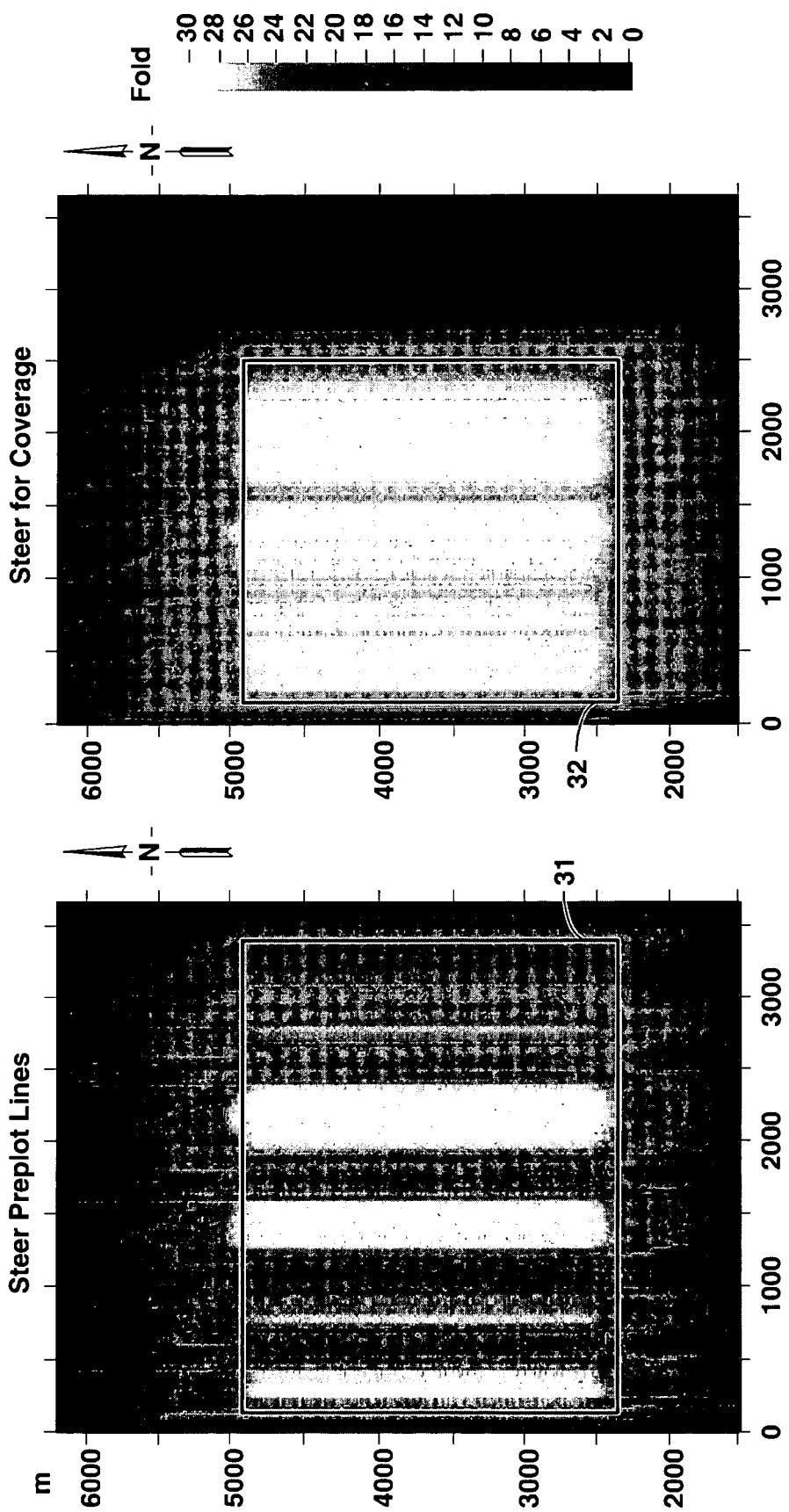
FIG. 3A shows a modeled coverage map for the example, assuming a steer preplot acquisition strategy.
FIG. 3B shows a modeled coverage map assuming a steer-for-coverage strategy.

FIGS. 3A and 3B show modeled coverage maps from two possible acquisition strategies that involve different levels of infill. The shading on the maps indicates the number of traces whose midpoints (the point halfway between the source and receiver) fall inside a 25 m×6.25 m rectangle. This number is referred to as "fold". The maps have been modeled for acquisition using eight streamers separated by 100 m with eight North-South oriented sail lines. Feather varies between sail lines as listed in Table 1. Note that the angles in Table 1 are not the real feather angles—these are not available during survey design because the data have not been collected yet. The angles listed in Table 1 are just one possible set of feathers that are consistent with historical information about current variations.

TABLE 1

Feather Angles for Coverage Model

| Sail Line (numbered W-E) | Feather (from Nominal) |
|---|---|
| 1 | 10° |
| 2 | 15° |
| 3 | 20° |
| 4 | 10° |
| 5 | 15° |
| 6 | 10° |
| 7 | 15° |
| 8 | 25° |

FIG. 3A is a map for an acquisition strategy called "Steer Preplot Lines," and it shows the fold variations that would result if the survey vessel followed the sail lines laid out in the survey design, without making any attempt to compensate for changes in streamer feather between sail lines. FIG. 3B is a map for an acquisition strategy called "Steer for Coverage," and it shows the fold variations that would result if the course of the survey vessel were altered during acquisition to account for any variations in streamer feather. (Steering for coverage is one type of infill acquisition.) In this example, the vessel has ben steered to produce full fold coverage for offsets up to 1500 m. Because steering for coverage requires overlapping sail lines, more sail lines are required to cover the entire survey area. This increases the cost of the survey. Fold magnitude is displayed in FIGS. 3A and 3B in terms of shading variations which are quantified by the shading bar shown with the figures.

The variations in fold seen in FIG. 3A and to a much lesser extent in FIG. 3B result in amplitude artifacts on the processed image of the reflector. The artifacts depend on the specific acquisition geometry that produced the variable fold, the geometry of the target reflector, and the processing flow applied to the seismic data. For this example, it is assumed that the target reflector is flat, and that the processing consists of an unnormalized common midpoint stack. (Geophysical terminology used herein is standard, and definitions may be found in, for example, the *Encyclopedic Dictionary of Exploration Geophysics* by R. E. Sheriff, published by the Society of Exploration Geophysicists.) Under these assumptions, the fold variations in FIGS. 3A and 3B will be proportional to the artifacts that will appear in the processed amplitudes.

The purpose of this example is to use the present inventive method to decide whether the reduction in artifacts seen in FIG. 3B as compared to FIG. 3A will improve drilling results enough to justify the increased cost of acquiring infill data. FIG. 2 together with the Ten Million-Dollar well drilling cost provides the economic information needed for the simulation and FIGS. 3A and 3B provide the artifact values. Table 2 lists the values of the reservoir properties that do not change over the reservoir area, and Table 3 shows the probability distributions for the two reservoir properties that vary within the reservoir. In a real case, the values listed in Tables 2 and 3 would typically come from well information.

TABLE 2

Invariant Reservoir Properties

| | |
|---|---|
| Thickness (m) | 50 |
| Vshale | 20% |
| Temperature (° C.) | 100 |
| Pressure (Mpa) | 45 |
| Gas Gravity | 0.7 |
| Salinity (ppm) | 100000 |

TABLE 3

Triangular Distribution Limits for Variable Reservoir Properties

| | Porosity | Gas Saturation |
|---|---|---|
| Minimum | 7% | 50% |
| Most Likely | 20% | 70% |
| Maximum | 25% | 90% |

Figure 4:
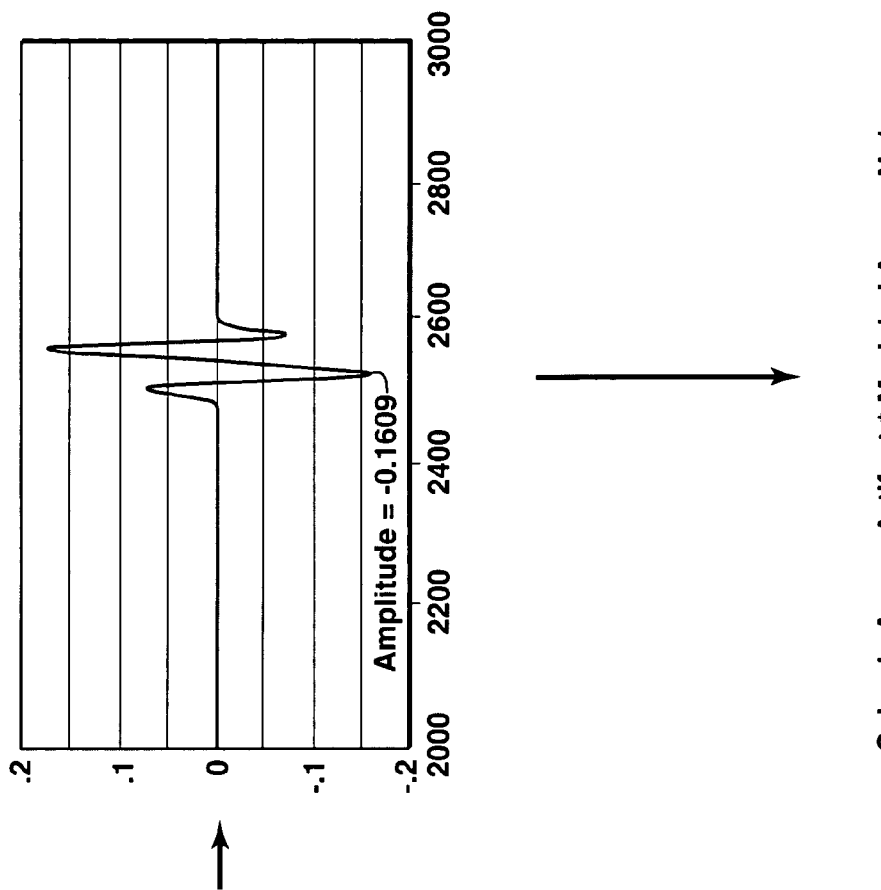
FIG. 4 illustrates the first three steps in FIG. 1 in the context of the example.
Figure 4:
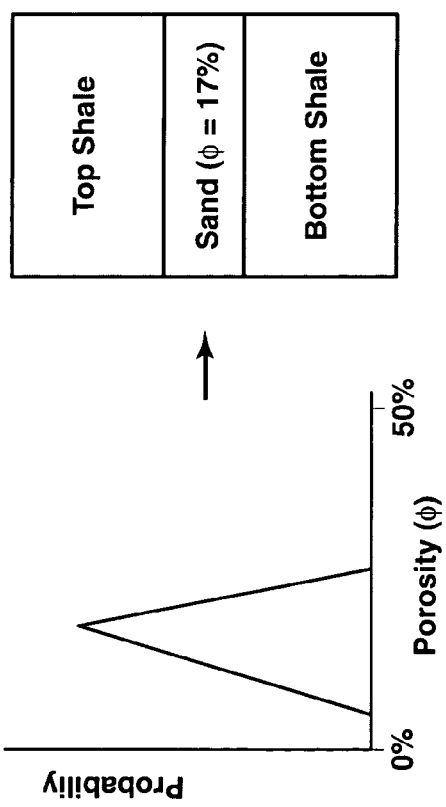
Figure 4:
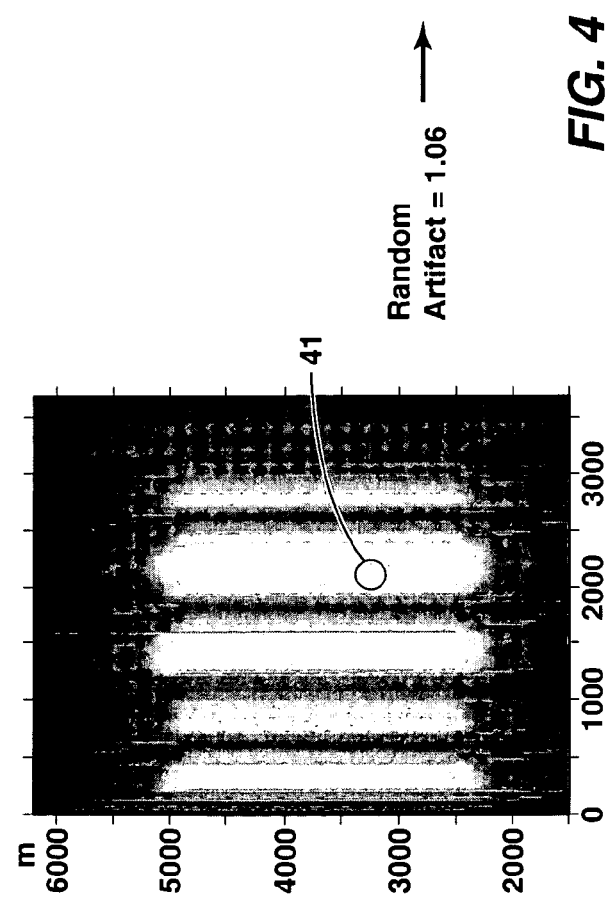

The following paragraphs describe the present inventive method as applied to this particular example. The various steps in the flow chart of FIG. 1 will be noted. FIG. 4 illustrates steps 1–3. First, a random realization of the reservoir is constructed by drawing values of the reservoir properties from the input probability distributions. (Step 1) In the upper left portion of FIG. 4, a probability distribution is shown for the reservoir property porosity. The three data points from Table 3 are connected by straight lines to give a "triangular" distribution. It will be apparent to those skilled in the art that more data points could be used, and more complex shapes could be fit to the data. FIG. 4 illustrates only porosity variations, but both porosity and gas saturation are actually varied in the example. FIG. 4 also shows a random sampling of the porosity distribution that has generated a realization of the reservoir model consisting of a 50 m thick layer of sand with porosity 17% sandwiched between two shale layers. In step 2, the seismic traces that would be recorded from the reservoir realization are modeled, and a seismic attribute is extracted. In the example, ten traces at uniform offset increments between 100 m and 3150 m are modeled and stacked. The seismic attribute selected in this case is the peak seismic amplitude of the top reservoir reflection. Typically, the user of the present invention will know what reservoir property or properties are being used to make well drilling decisions. That reservoir property will preferably be the one selected in step 4 of FIG. 1. The seismic attribute that the user selects in step 2 will be selected based on its ability to correlate with, and hence predict, the reservoir property or properties selected in step 4. FIG. 4 shows that an amplitude value of −0.1609 is extracted in this particular simulation.

In step 3, the extracted attribute is distorted by multiplying by an artifact value and adding noise. In the example, artifact multipliers are drawn randomly from the full fold region of an artifact map. (Full fold regions are indicated by the rectangles 31 and 32 in FIGS. 3A and 3B, with the rectangles made as large as possible but excluding edge effects.) FIG. 4 shows an artifact map that is randomly sampled at location 41 to yield an artifact multiplier of 1.06. This value is the fold value from location 41 in the artifact map after normalizing the fold value scale such that the average fold value is unity. Gaussian noise with a standard deviation equal to 5% of the RMS reflector amplitude is added poststack. The additive noise is multiplied by the square root of the artifact to simulate incoherent summing. In FIG. 4, the noise value is −0.005. This is but one possible way of representing noise. (Another way of representing noise is to model it externally and use that model as input to the artifact modeler software program used to generate FIG. 4, and thereby generate a noise map that can be randomly sampled.) The result of the modeling is an artifact-distorted, noise-contaminated version of the attribute value expected from the random reservoir model. In FIG. 4, a numerical value of −0.176 is shown.

Figure 5:
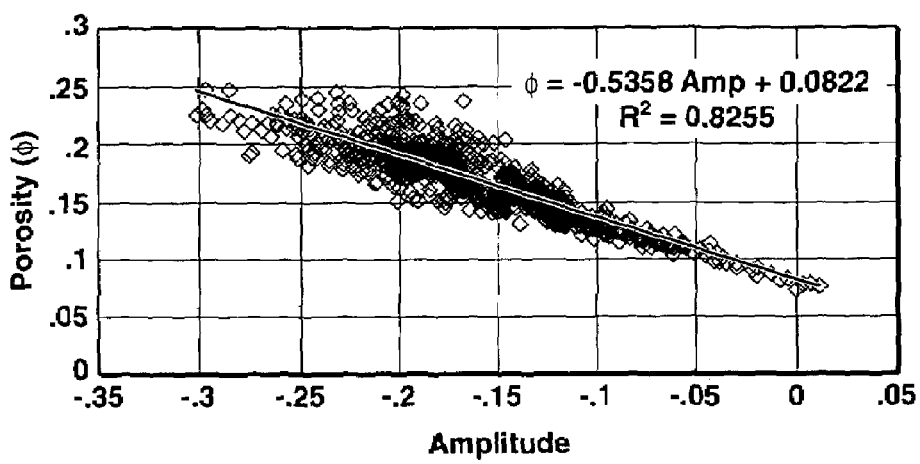
FIG. 5 shows the calibration data set for the example assuming steer preplot acquisition strategy.
Figure 6:
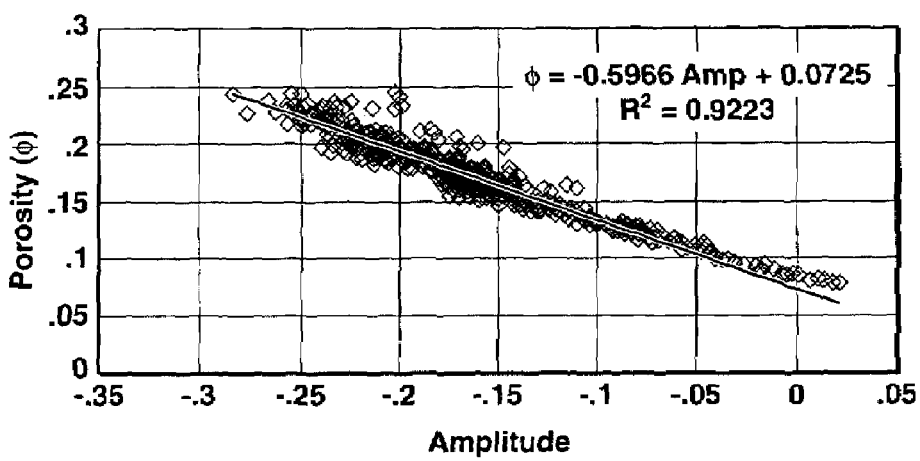
FIG. 6 shows the calibration data set for the example assuming steer-for-coverage acquisition strategy.

Before starting the main loop of the simulation, the modeling process can be used to generate a calibration data set for predicting reservoir properties. (Externally derived data may also be used for calibration.) Each random realization of the reservoir produces an artifact-distorted seismic amplitude. Plotting the "true" porosity value of each model vs. the corresponding seismic amplitude defines the relationship between porosity and amplitude that will be used to make porosity predictions. In this example, we will make predictions using the straight line that has been least squares fitted to the calibration data. FIG. 5 shows such a calibration plot where the (steer preplot) artifact map of FIG. 3A has been used to distort the extracted amplitude values. FIG. 6 shows the calibration plot corresponding to the steer for coverage strategy (FIG. 3B). In each case, many simulations have been run to accumulate good statistics, and a least squares fit has been made to the data with the equation for the straight line shown on the figure. (The figures also show the standard $R^2$ measure of how well the straight line fits the data, with a value of unity being a perfect fit and values of $R^2<1$ representing progressively worse fits.) Both calibration data sets are based on the same set of reservoir realizations. The differences between the two are due entirely to the differences in artifacts. The equations of the straight line are used to make predictions of porosity from seismic amplitudes (step 4 in FIG. 1).

The example calls for a ten-well drilling program. Each well is represented by a single random model simulation as just described. Table 4 shows the data for the ten wells. Porosity predictions in Table 4 are based on modeled seismic amplitudes that are distorted by the "Preplot" artifacts from FIG. 3A. The first line in Table 4 shows that the random reservoir realization drawn at well location 1 has an actual (model) porosity of 16.5%, and an artifact-distorted seismic amplitude of −0.1776. The calibration equation for "Preplot" data in FIG. 5 predicts a porosity of 17.7% from this amplitude. From the economic value plot in FIG. 2, the net value of a well that encounters 17.7% porosity, after subtracting the $10 M well cost, is expected to be $0.93 M. Because the value is positive, the decision of step 5 is to drill at this location. But the actual porosity of the reservoir at this location is only 16.5%, and FIG. 2 shows some economic value at that porosity, but not enough to cover the $10 M cost of drilling. Consequently, well 1 ends up losing $4.09 M instead of making $0.93 M, which is duly recorded in Table 4. The next proposed drilling location, well 2, has a predicted porosity that is too low to be economic, so it is not drilled and zero value is entered in the last column of Table 4. If the well had been drilled, it would actually have generated a small positive value net revenue ($0.12 M), but such hindsight is incidental to the present inventive method. Location 3 is also predicted to be uneconomic (correctly, this time), and is also not drilled. Location 4 is predicted to have a porosity of 19% and a net value of $6.02 M. Thus, the well is drilled, with the result that the actual porosity (18.7%) gives a smaller, but still positive, value of $4.73 M. At the remaining drilling locations, all of the drilling decisions are correct—all the uneconomic wells are not drilled, and all the economic wells are drilled (although their values turn out to be different from the predictions).

TABLE 4

Predictions and Outcomes for a Specific Drilling Program
Steer Preplot Lines

| Well | Seismic Amplitude | Predicted Porosity | Predicted Value ($M) | Drilled | Actual Porosity | Actual Value ($M) | Realized Value ($M) |
|---|---|---|---|---|---|---|---|
| 1 | −0.1776 | 17.7% | 0.93 | Yes | 16.5% | −4.09 | −4.09 |
| 2 | −0.1364 | 15.5% | −7.89 | No | 17.5% | 0.12 | 0.00 |
| 3 | −0.1251 | 14.9% | −10.00 | No | 17.4% | −0.28 | 0.00 |
| 4 | −0.2013 | 19.0% | 6.02 | Yes | 18.7% | 4.73 | 4.73 |
| 5 | −0.1108 | 14.2% | −10.00 | No | 13.9% | −10.00 | 0.00 |
| 6 | −0.1968 | 18.8% | 5.04 | Yes | 20.7% | 12.88 | 12.88 |
| 7 | −0.2548 | 21.9% | 17.48 | Yes | 23.1% | 25.18 | 25.18 |
| 8 | −0.1360 | 15.5% | −7.97 | No | 14.2% | −10.00 | 0.00 |
| 9 | −0.1436 | 15.9% | −6.36 | No | 14.1% | −10.00 | 0.00 |

TABLE 4-continued

Predictions and Outcomes for a Specific Drilling Program
Steer Preplot Lines

| Well | Seismic Amplitude | Predicted Porosity | Predicted Value ($M) | Drilled | Actual Porosity | Actual Value ($M) | Realized Value ($M) |
|---|---|---|---|---|---|---|---|
| 10 | −0.2571 | 22.0% | 17.97 | Yes | 21.6% | 16.22 | 16.22 |
|  |  |  |  |  |  | Total: | 54.92 |

TABLE 5

Predictions and Outcomes for a Specific Drilling Program
Steer for Coverage

| Well | Seismic Amplitude | Predicted Porosity | Predicted Value ($M) | Drilled | Actual Porosity | Actual Value ($M) | Realized Value ($M) |
|---|---|---|---|---|---|---|---|
| 1 | −0.1583 | 16.7% | −3.22 | No | 16.5% | −4.09 | 0.00 |
| 2 | −0.1610 | 16.9% | −2.57 | No | 17.5% | 0.12 | 0.00 |
| 3 | −0.1792 | 17.9% | 1.76 | Yes | 17.4% | −0.28 | −0.28 |
| 4 | −0.1795 | 18.0% | 1.84 | Yes | 18.7% | 4.73 | 4.73 |
| 5 | −0.1278 | 14.9% | −10.00 | No | 13.9% | −10.00 | 0.00 |
| 6 | −0.2030 | 19.4% | 7.46 | Yes | 20.7% | 12.88 | 12.88 |
| 7 | −0.2459 | 21.9% | 17.69 | Yes | 23.1% | 25.18 | 25.18 |
| 8 | −0.1292 | 15.0% | −10.00 | No | 14.2% | −10.00 | 0.00 |
| 9 | −0.1250 | 14.7% | −10.00 | No | 14.1% | −10.00 | 0.00 |
| 10 | −0.2325 | 21.1% | 14.49 | Yes | 21.6% | 16.22 | 16.22 |
|  |  |  |  |  |  | Total: | 58.72 |

Table 5 lists the results of the same drilling program, with the same set of reservoir realizations, but where "steer for coverage" artifacts (FIG. 3B) are applied. Compared to Table 4, only two drilling decisions change as a result of the lower level of artifacts. Location 1 is correctly predicted to be uneconomic, avoiding the $4.09 M loss we had with the "Preplot" data. But, location 3 is incorrectly predicted to be economic, and the well incurs a small $0.28 M loss. It can be seen that the predicted porosity at location 3 is actually closer to the correct value than the prediction made from the preplot data. This is a reminder of the statistical nature of the present inventive method. In any single case, such as well No. 3, the prediction to drill or not may be incorrect even though based on better data. For the whole drilling program, the steer for coverage data results in a gain of $3.8 Million compared to the result for the steer preplot strategy.

The difference in drilling program values shown in Tables 4 and 5 applies only to the specific set of reservoir models and artifact values that happened to be selected by the particular twenty loops made through the cycle of steps in FIG. 1. Other sets of models and artifact values will produce different results. To get an accurate, precise (within the accuracy limits of the input data) estimate of drilling program value, it is necessary to simulate and average a large number of drilling programs.

Figure 7:
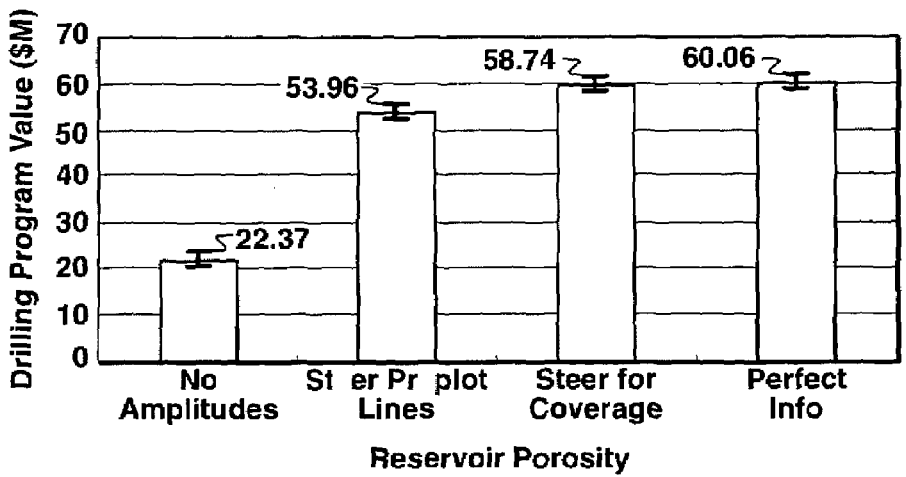
FIG. 7 is a bar graph showing the expected drilling program values for different acquisition strategies in the example.

FIG. 7 shows the drilling program values averaged over 500 simulated drilling programs, for a total of 5000 potential drilling locations. In addition to the values for the steer preplot and steer for coverage data sets, FIG. 7 shows values computed by the present inventive method for two limiting cases: a case where wells are drilled without using amplitude information (wells are drilled at every one of the ten randomly selected locations), and a hypothetical case where perfect information about the success or failure of each well is available before drilling. The error bars shown are 80% uncertainty limits on the value estimates, computed using the Central Limit Theorem. FIG. 7 shows that the infill data acquired in "steer for coverage" mode will increase the value of a 10-well drilling program by about $4.8 M. This means that steering for coverage is economically justified as long as it adds less than $4.8 M to the acquisition costs.

This example illustrates the application of the invention in pre-survey mode, where the coverage plots (FIGS. 3A and 3B) come from modeled geometry based on the expected variation in currents in the survey area. The goal of the analysis was to decide whether to acquire data by sailing the preplot lines, or by overlapping lines to fill in gaps in coverage. When acquisition is in progress, the same process can be applied using the actual acquisition geometry, either on the survey vessel or on shore, to decide whether to infill any large gaps that may arise in the real coverage.

The foregoing description is directed to particular embodiments of the present invention for the purpose of illustrating it. It will be apparent, however, to one skilled in the art that many modifications and variations to the embodiments described herein are possible. It will also be apparent that the invention is very suitable for automation, and will be embodied in computer software in preferred embodiments of the invention. All such modifications and variations are intended to be within the scope of the present invention, as defined in the appended claims.

I claim:

1. A method for predicting whether increased coverage in a seismic survey of a petroleum reservoir is economically justified, where ranges of reservoir properties are known and dependency of reservoir economics on reservoir properties are also known, said method comprising the steps of:
   (a) selecting a first survey strategy and a second survey strategy, said two strategies differing in degree of coverage and therefore in cost;
   (b) selecting at least one reservoir property, said property being one that affects reservoir economics in a known way, and selecting a seismic attribute that is known to be a predictor of the at least one selected reservoir property;

(c) generating a reservoir model for the reservoir in which a specific value is selected for each reservoir property from within the known range for that property;

(d) using the reservoir model to generate a seismic trace;

(e) computing the selected seismic attribute from the seismic trace;

(f) distorting the computed attribute value with artifact information based on the first survey strategy;

(g) using the distorted attribute value to predict the value of the at least one selected reservoir property;

(h) using said known way and the predicted at least one reservoir property to predict the net economic value of petroleum that a well would produce under the specific reservoir model conditions;

(i) repeating steps (f)–(h) for the second survey strategy; and (j) finding the difference between the well values for the two survey strategies by and comparing that difference to the survey cost difference.

2. The method of claim 1, wherein the step of generating a reservoir model includes random sampling of known probability distributions for at least the reservoir properties selected in step (b), and wherein the artifact information in the step of distorting the attribute is a is based on a fold value determined by random sampling a map of the survey strategy, and wherein said method further comprises the step of repeating steps (c)–(j) until a pre-selected statistics criterion is met for the average of the step (j) results.

3. The method of claim 1, further comprising the step of making a noise adjustment to the artifact-distorted attribute value.

4. The method of claim 3, wherein the noise is assumed to have a Gaussian distribution about a zero mean value, and the noise adjustment is randomly selected from this distribution.

5. The method of claim 1, wherein the prediction in step (g) is made from calibration data of the selected attribute vs. the at least one selected reservoir property.

6. The method of claim 5, wherein the step of generating a reservoir model includes random sampling of known probability distributions for the at least one selected reservoir property, and wherein the calibration data are generated by a plurality of iterations of steps (c)–(f), each iteration using a different random sampling to produce a different reservoir model, and wherein the resulting calibration data from each iteration are the distorted attribute value from step (f) vs. the specific value selected in step (c) for the at least one selected reservoir property.

* * * * *